United States Patent [19]
Berner

[11] Patent Number: 6,038,024
[45] Date of Patent: Mar. 14, 2000

[54] METHOD AND AN APPARATUS FOR DETERMINING THE COLOR STIMULUS SPECIFICATION OF AN OBJECT

[75] Inventor: Markus Berner, Niederhasli, Switzerland

[73] Assignee: MHT Optic Research, Niederhasli, Switzerland

[21] Appl. No.: 09/227,666

[22] Filed: Jan. 8, 1999

[30] Foreign Application Priority Data

Jan. 9, 1998 [CH] Switzerland .............................. 0027/98
Dec. 8, 1998 [EP] European Pat. Off. .............. 98811204

[51] Int. Cl.[7] ....................................................... G01J 3/28
[52] U.S. Cl. ........................... 356/326; 356/407; 356/425
[58] Field of Search ..................................... 356/326, 405, 356/407, 425, 328, 402; 433/26, 29

[56] References Cited

U.S. PATENT DOCUMENTS

| | | | |
|---|---|---|---|
| 5,383,020 | 1/1995 | Vieillefosse | 356/326 |
| 5,428,450 | 6/1995 | Vieillefosse et al. | 356/405 |
| 5,759,030 | 6/1998 | Jung et al. | 433/29 |

FOREIGN PATENT DOCUMENTS

WO 86/03292  6/1986  WIPO .............................. G01J 3/50

*Primary Examiner*—Frank G. Font
*Assistant Examiner*—Layla Lauchman
*Attorney, Agent, or Firm*—Tarolli, Sundheim, Covell, Tummino & Szabo L.L.P.

[57] ABSTRACT

In order to determine the color stimulus specification of a translucent object under test, it is suggested to illuminate the object under test with light having different wave length bandwidth portions, or, alternatively, to subdivide the light reflected by the object under test into different wave length bandwidth portions before it is captured by an image sensor. To exactly approach a probe head to the object under test, the object under test is visualized with the help of a further image sensor. Preferably, two image sensors are used, whereby the one image sensor is used for visualizing the object under test and the other image sensor is used for determining the colorimetric data of the object under test. In this way, the color stimulus specification of the object under test can be determined very exactly. Moreover, such a method including an apparatus suitable for performing the method can be practically realized very easily.

44 Claims, 1 Drawing Sheet

METHOD AND AN APPARATUS FOR DETERMINING THE COLOR STIMULUS SPECIFICATION OF AN OBJECT

FIELD OF THE INVENTION

The present invention refers to a method for determining the color stimulus specification of objects, particularly of translucent objects, in which the object under test is illuminated, in which the light reflected by the object under test is captured by at least one image sensor, and in which the colorimetric data of the object under test are arithmetically evaluated by means of a suitable analyzer assembly.

Moreover, the present invention also refers to an apparatus for determining the color stimulus specification of objects, particularly of translucent objects, comprising an illumination assembly for illuminating the object under test, a detection assembly for capturing the light emitted by the illumination assembly and reflected by the object under test, and an analyzer assembly adapted for evaluating the colorimetric data of the object under test. The detection assembly includes a lens assembly and at least one image sensor, and it is adapted to deliver output signal data in response to the captured light.

1. Background of the Invention

The determination of the hue or tint of translucent objects is a process which is frequently performed in the field of dentistry. In practice, it is necessary to select that denture out of a number of sample dentures which matches the hue or tint of the tooth to be replaced. Frequently, instead of determining the color of the tooth to be replaced, the hue or tint of the adjacent tooth or of the two adjacent teeth is determined.

The manufacturers of basic materials for the production of a denture can supply assortments comprising a plurality of sample dentures having different hue or tint; each denture of such an assortment has an allocation number by which the hue or tint of the denture is exactly specified. If a dentist has to produce a denture, up to now he proceeds, simply expressed, as follows:

He visually compares the color of the tooth to be replaced with the color of the dentures provided in an assortment and selects that denture of the assortment which matches the color of the tooth to be replaced most closely. On the basis of the allocation number of the selected denture, the dentist knows the exact specification of the materials needed to produce a denture with the same hue or tint and he is in a position to manufacture the required individual denture. However, this proceeding is, on the one hand, quite lavish and can lead, on the other hand, to errors as far as the hue or tint of the final denture is concerned.

2. Prior Art

Methods and apparatuses are known in the art to determine the color stimulus specification of translucent objects. In these methods and apparatuses, the object to be tested and a portion thereof, respectively, is illuminated by a light spot, and the light reflected by a predetermined area, called measurement spot, is measured and subsequently evaluated. But due to the fact that neither the measurement spot nor the light spot projected onto the surface of the object under test are infinitely large and theoretically cannot be infinitely large, a measurement error results in practice. The reasons for this measurement error, on the one hand, is that a part of the light leaves the measurement spot through the interior of the translucent object, and on the other hand, that a certain amount of light penetrates through the translucent object and further illuminates the measurement spot. In other words, because the luminous flux leaving the translucent object to be tested is not equal to the luminous flux which is coupled from the exterior into the measurement spot and which is received by the receiving element, the measuring result is distorted in dependence of the translucency of the object under test.

The above mentioned measurement error leads to the fact that the color stimulus specification of unknown translucent objects cannot be measured with sufficient accuracy with the help of the systems known up to know.

Moreover, apparatuses for determining the color stimulus specification of teeth are known in the art that operate according to the following principles:

A small probe head is put onto the tooth to be evaluated. From the position of the probe head, the operator, i.e. the dentist, knows which area of the tooth is evaluated. An exact positioning of the probe head is important insofar as the tooth doesn't have a uniform color. In order to determine the colors of the tooth in different areas, the dentist has to position the probe head in the different areas and, in each case, trigger a measuring cycle.

Thereby, the illumination and the measuring of the color both are accomplished in the interior of the small probe head. Due to the translucent behavior of the teeth, the thus obtained results are primarily erroneous, as has been explained herein before. These measurement errors now are corrected with suitable mathematical and/or optical tricks. However, the final result still is not satisfying.

OBJECTS OF THE INVENTION

Thus, it is an object of the present invention to provide a method and an apparatus for determining the color stimulus specification of objects, particularly of translucent objects, by means of which the color stimulus specification can be determined very exactly. It is a further object of the present invention to provide a method and an apparatus for determining the color stimulus specification of objects, particularly of translucent objects, which can be realized in a very simple and efficient way.

SUMMARY OF THE INVENTION

In order to meet these and other objects, the present invention provides, according to a first aspect, a method for determining the color stimulus specification of objects, particularly of translucent objects. In this method, the object under test is illuminated, the light reflected by the object under test is captured by at least one image sensor, and the colorimetric data of the object under test are arithmetically evaluated by means of a suitable analyzer assembly. During the above step of illuminating the object under test, a measuring cycle is initiated and, thereafter, the light by means of which the object under test is illuminated is subdivided into a plurality of wave length bandwidth portions. Then, the object under test is consecutively illuminated by means of light comprising wavelengths of one of the plurality of wave length bandwidth portions. Finally, the measuring cycle is terminated and the above step of evaluating the colorimetric data is performed.

According to a second aspect of the invention, a method for determining the color stimulus specification of objects, particularly of translucent objects, is provided in which the object under test is illuminated, the light reflected by the object under test is captured by at least one image sensor, and the colorimetric data of the object under test are arithmetically evaluated by means of a suitable analyzer assembly. During the above mentioned step of capturing the light reflected by the object under test by at least one image sensor, a measuring cycle is initiated, and thereafter, the light reflected by the object under test is subdivided into a plurality of wave length bandwidth portions. Consecutively, the light reflected by the object under test and comprising wavelengths of one of the plurality of wave length bandwidth portions is directed to the at least one image sensor, whereafter the measuring cycle is terminated and the above step of evaluating the colorimetric data is performed.

By the suggested methods as outlined above, in which the object under test is illuminated with light having different wave length bandwidth portions, or in which the light reflected by the object under test is subdivided into different wave length bandwidth portions before it hits the image sensor or sensors, respectively, the prerequisite is created for a method than can be realized in a very simple manner, thereby avoiding the spectral evaluation of the captured light by means of a spectra photo meter as suggested in the prior art. Moreover, the color stimulus specification of the object under test can be determined, with regard to the human perception, more exactly than until now.

According to preferred embodiments of both of the above outlined methods, the object under test is mapped onto the image sensor, and the signal data delivered by the image sensor are visualized. Thereby, performing the measurement is greatly simplified and the ease of operation is increased insofar as the positioning of the probe head required for capturing the reflected light is simplified for the operator, independently of the size of the probe head.

Still in order to meet the above mentioned and further objects, the present invention provides, in a further aspect, an apparatus for determining the color stimulus specification of objects, particularly of translucent objects. Two different realizations of that apparatus are suggested. Common to both realizations is that the apparatus comprises an illumination assembly for illuminating the object under test. Further, both realizations of the apparatus comprise a detection assembly for capturing the light emitted by the illumination assembly and reflected by the object under test, whereby the detection assembly includes a lens assembly and at least one image sensor. The detection assembly delivers output signal data in response to the captured light. Finally, there is provided in both realizations an analyzer assembly for evaluating the colorimetric data of object under test, a probe head adapted to receive selected parts and elements of the apparatus, whereby the probe head can be displaced towards the object under test for taking a measurement, and means for visualizing the output signal data delivered by the detection assembly.

The above mentioned two realizations of the apparatus differ insofar as, in the first realization, the illumination assembly is provided with a color separator adapted to subdivide visible light into a plurality of wave length portions, and, in a second case, the detection assembly is provided with a color separator adapted to subdivide visible light into a plurality of wave length portions.

BRIEF DESCRIPTION OF THE DRAWING

In the following, the method of the invention as well as an embodiment of an apparatus for performing the method will be further described, with reference to the accompanying, strictly schematic drawing, showing the general layout of an apparatus for determining the color stimulus specification of translucent objects.

DETAILED DESCRIPTION OF THE INVENTION

Figure 1:
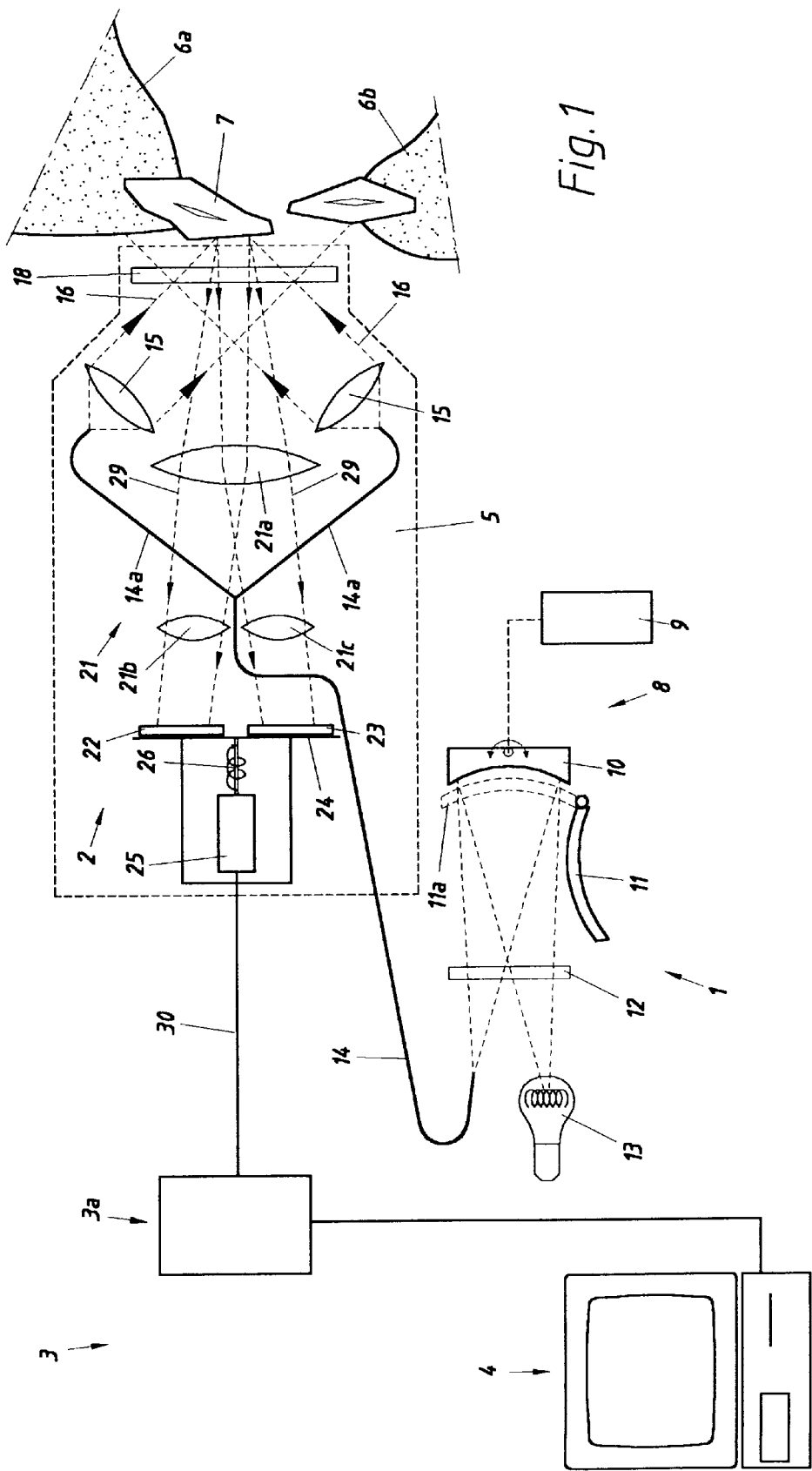

With the aid of the accompanying drawing, the design and the mode of operation of the apparatus for determining the color stimulus specification of translucent objects will be further explained. Since the method and the apparatus according to the invention are particularly useful for determining the color stimulus specification of teeth, a partial sectional view of the upper and lower jaw 6a, 6b of a human being is schematically shown. As the real object under test, an upper incisor 7 is selected. In looking at the accompanying drawing, it has to be considered that it shows the invention in a strictly schematic matter and is not drawn to scale.

The apparatus substantially comprises an illumination assembly, generally designated by reference numeral 1, a detection assembly, generally designated by reference numeral 2, and an analyzer assembly, generally designated by reference numeral 3. Selected elements of the apparatus are received in a probe head 5 that is moved towards the object under test 7 when a measurement has to be performed.

Preferably, the probe head 5 can be replaced by a probe head of somewhat different design, such that, if appropriate, another probe head 5 can be used that is perfectly matched to the specific requirements of the measurement to be performed. For example, if the object under test 7 just has to be visualized, without the need to determine the color stimulus specification of the object under test 7, a relatively small and handy probe head can be used, since such a probe head has to receive a substantially smaller number of elements.

The illumination assembly 1 comprises a light source 13, an UV band elimination filter 12, a concave mirror 11, a color separator 8, a bundle of light conducting fibers 14 as well as a number of lenses 15. The color separator 8 designed as a monochromator comprises a step motor 9 as well as a concave mirror 10 incorporating a diffraction grating. The concave mirror 10 provided with the diffraction grating can be rotated by means of the step motor 9 around an axis that runs perpendicular to the drawing plane. Between the light source in the form of a bulb 13 and the monochromator 8, there is inserted an UV band elimination filter 12. Between the UV band elimination filter 12 and the monochromator 8, there is inserted a conventional concave mirror 11 without diffraction grating. The concave mirror 11 without diffraction grating can be swiveled, by means not further shown in the drawing, between a rest position and an operating position 11a. The bulb 13, the UV band elimination filter 12, the concave mirror 11 as well as the monochromator 8 are located outside of the probe head 5, while the bundle of light conducting fibers 14 is lead into the interior of the probe head 5 and optically couples the probe head 5 with the bulb 13.

The end of the bundle of light conducting fibers 14 is separated into individual fibers 14a in the interior of the probe head 5. In order to ensure an illumination of the object under test 7 as homogenous as possible, the individual fibers 14a are arranged along the periphery of a circle. The lenses 15 located in front of the fibers 14a additionally contribute to a homogenous illumination of the object under test 7. Preferably, not only the object under test 7 per se, but also the adjacent regions of the upper and lower jaw 6a, 6b are illuminated as well; thereby, the problems arising in determining the color stimulus specification of translucent objects discussed herein before can be eliminated to a great extent.

Anyway, due to the translucent behavior of the object under test 7, it is important that the illuminated area is larger than the area scanned during determining the color stimulus specification of the object under test 7.

The detection assembly 2 essentially comprises a lens assembly 21 centrally located in the interior of the probe head 5 as well as two image sensor members 22, 23. Even if only three lenses 21a, 21b and 21c are shown in the drawing, in practice, a more complex, highly corrected lens assembly is used. However, for the reason of simplicity, in the following, reference is made to the lens assembly 21.

The analyzer assembly 3 comprises a suitably video circuitry 3a as well as a computer 4 comprising a video monitor, for example a commercially available personal computer.

The image sensor members 22, 23 are constituted, in the present embodiment, by CCD (charge coupled device) chips. The one image sensor 22 comprises a color CCD chip, while the other image sensor 23 comprises a black-and-white CCD chip. Both image sensor members 22, 23 are connected to the video circuitry 3a by means of a data cable 30. Moreover, the probe head is provided with a polarizer 18; the design and the mode of operation thereof will be further explained herein after.

In order to perform a measurement cycle in which the color stimulus specification of the object under test 7 is determined, the conventional concave mirror 11 has to be in its rest position, i.e. swiveled to its lower position, such that the light emitted by the bulb 13 is reflected by the concave mirror 10 which is provided with the refraction grating and, thereby, directed to the input end of the bundle of light conducting fibers 14. By rotating the concave mirror 10 which is provided with the refraction grating, the wave length portion of the light coupled to the bundle of light conducting fibers 14 is varied. In the present embodiment, by rotating the concave mirror 10 by approximately 15°, the light emitted by the bulb 13 is selectively directed to the input end of the bundle of light conducting fibers 14 in a region of wave lengths between appr. 380 nanometers and appr. 730 nanometers; this region corresponds more or less to the visible light. The light reflected by the object under test 7 to the B/W sensor 23 is recorded as an image and assigned by calculation to that wave length region by which the object under test 7 has been illuminated by the illumination assembly 1. This recording is performed in steps whereby a step length of appr. 10 nanometers has proven as advantageous. Thus, a total of thirty-six different spectral backing values in the region of the visible light are recorded and analyzed.

Moreover, it is possible to swivel the concave mirror 10 into a inoperative position in which the light emitted by the bulb 13 and passing the UV band elimination filter 12 is not directed to the input end of the bundle of light conduction fibers 14. If the monochromator 8 is in that so-called dark position, a dark correction of the apparatus can be performed. In other words, the measurement value present at the image sensors 22, 23 during that dark correction, the so-called dark value, corresponds to the amount of ambient light falling onto the object under test 7 and onto the detection assembly 2. In order to avoid a distortion of the measurement values present at the image sensors 22, 23 caused by ambient stray light, in each case, that dark value is subtracted from the really measured value.

In order to provide for a wide-spread and homogenous illumination of the object under test 7, the probe head 5 must have a certain minimal diameter. For determining the color stimulus specification of teeth, the probe head 5 preferably has a diameter of appr. 2 to 3 centimeters. However, since a probe head 5 of such a diameter fully covers the area to be measured, the position of the probe head 5 can be visualized by means of the color image sensor 22 in order to ensure that the dentist knows where exactly the apparatus will perform the measurement.

In order to visualize the object under test 7, the concave mirror 11 is swiveled in its operating position 11a, with the result that the light emitted by the bulb 13 present at the input gap is projected onto the bundle of light conducting fibers 14 at the output gap. In practice, the concave mirror 11 will be in its operating position most of the time such that the object under test 7 can be visualized by means of the color sensor 22. Only during performing a measurement, the mirror 11 is swiveled into its rest position, then the real determining of the color stimulus specification is performed by means of the B/W sensor 23, and then, the mirror is swiveled back into its operating position.

The two image sensors 22, 23 are located on a common support plate 24. The support plate 24 is operatively connected to an actuating system 25 by means of a spindle 26. By the provision of two image sensors 22, 23, an autofocus function can be realized very easily by means of which the image sensors 22, 23 are displaced automatically into the image plane of the lens assembly 21. Due to the parallax present between the two image sensors 22, 23, the distance of the object under test 7 can be calculated and the image sensors 22, 23 can be displaced into the image plane of the lens assembly 21. The result is that the object under test 7 is in focus on the two image sensors 22, 23.

The measuring rate of scanning the light intensity information delivered by the B/W sensor 23, i.e. the intensity of the gray value, by the video circuitry 3a is synchronized with the rotation speed of the concave mirror 10. For the sake of simplicity, only one simple wire connection is shown as representing the data cable 30 running between the probe head 5 and the analyzer assembly 3; however, it is understood that in fact a multi-strand cable is used by means of which the different elements 22, 23, 25 in the probe head 5 are electrically and, if appropriate, optically connected to the analyzer assembly.

In order to eliminate the surface glare of the object under test 7, it has proven to be extremely advantageous to provide a polarizer filter combination 18 in front of the object under test 7. A polarizer filter combination 18 is particularly important in determining the color stimulus specification of teeth, since the teeth glitter at their uneven surface portions with the result that the measuring values obtained by a number of consecutive measurements differ in an unpredictable manner. The polarizer filter combination 18 preferably is arranged such that both the light rays 16 emitted by the bulb 13 as well as the light rays 29 reflected by the object under test have to pass that polarizer filter combination 18.

Two different kinds of polarizer filter combinations capable of fulfilling that task are known: On the one hand, the polarizer filter combination can be designed comprising two linear polarizers, whereby the light of the bulb 13 passes the polarizer and the reflected light passes the analyzer. In this design, the polarizer and the analyzer have to comprise polarizing directions that are offset to each other by 90° (→ variant a).

On the other hand, the polarizer filter combination 18 can be designed comprising a linear polarizer and a circular polarizer. The two polarizers are to be arranged one behind the other one whereby the circular polarizer has to face the object under test 7. In this design, both the light of the bulb 13 as well as the reflected light has to pass both polarizers (→ variant b).

In the present embodiment, the variant a is preferred because a more effective suppression of glitter can be achieved with the polarizers available nowadays.

Since it is sufficient in determining the color stimulus specification even of a tooth with inhomogeneous coloration to make use of a measuring resolution of 20×20 points both in horizontal as well as in vertical direction, the measurement values of several pixels of the CCD chip 23 can be combined and averaged. If, for example, a conventional CCD chip is used having a resolution of 480×640 pixels, it is possible to combine (480/20)×(640/20)=24×32 pixels to a single image point by averaging. By that averaging, the noise is reduced by a factor of √768 =28; the result is that the noise is 28 times lower by the averaging. Moreover, by that averaging, the signal-to-noise ratio is increased by a factor of 28 to a value which is absolutely sufficient for a reliable analysis.

In order to reduce the amount of data, the number of image points can be further reduced, depending on the particular application.

In order to be in a position to distinguish whether the received signals come from the tooth 7 itself or from the adjacent areas of the object under test 7, the tooth 7 is scanned as far as his position an his geometry is concerned. For this purpose, an edge detection is performed. Thereby, the light/dark transitions (gap between the teeth as well as blade of the tooth) and the light/red transitions (transitions between tooth and gum) are arithmetically determined, whereby it is assumed that the position of the teeth is more or less known. The position and the shape of the tooth being known, it remains to further process only the lightness information that comes from the tooth itself.

Now, in the pictures captured in this way, the dither is removed. This is accomplished by creating a cross correlation between the lines of the individual images of the different wavelengths and by shifting the individual images with regard to each other until the cross correlation achieves a maximum. That cross correlation is performed for both axes of the image as well as for all captured wavelengths.

On the basis of these measured values, finally, the color specific data of the object under test can be determined on all 400 image points.

Out of the 400 captured image points, it is possible to arithmetically combine to color zones those adjacent image points whose color deviation does not exceed a predetermined value. In this way, the object under test can be subdivided into several color zones having different color stimulus specification. The maximum number of such color zones is particularly limited by practical points of view, because a dentist usually subdivides a denture only into a limited number of color zones.

Of course, it is also possible to assign a uniform color stimulus specification to the tooth that has been measured as far as its coloration is concerned. Thereby, it is preferred to calculate the mean value of the captured image points on the tooth; that mean value can be used as a relevant value for determining a uniform color.

By subdividing the object under test into a plurality of measuring points, a plurality of new possibilities are presented which play an important role particularly in determining the color stimulus specification of teeth. For example, in this way, for the first time a tooth can be subdivided into several zones having different color stimulus specifications. Thereby, for the first time an incisor having a plurality of hues can be exactly reproduced, as far as its color is concerned.

In the following, a list is presented that shows some of the possibilities resulting from the method of the invention. It is understood that this list is not complete.

1. Display of the video picture on the monitor for positioning the probe head and functionality of the system as an intro oral camera, respectively.
2. White and dark correction of the video images.
3. Color correction of the video images.
4. Autofocus function.
5. Storing the video images in a data base.
6. Recalling the video images from the data base.
7. Superimposing a scale in the video image.
8. White and dark correction of the spectral data.
9. Assignment of the color code of the colors of the dentures at every point of the video image.
10. Calculation of a uniform, mean color code for the entire object under test (tooth).
11. Determining of several zones with a uniform color selection.
12. Simulation of color selections in the video image.
13. Comparing corresponding images taken on different dates; superimposing the images.
14. Calculation of color changes in function of the time at certain points on the tooth and on the gum, respectively.
15. Calculation of the degeneration of the gum.
16. Transmission of the date to the dental technician.

Most of the above mentioned characteristics are useful, first and foremost, in measuring teeth. However, some of the above characteristics may also be important in connection with other applications, for instance characteristics 1 to 3: In some applications, the absolute color of the video image is of interest; for example, in the field of endoscope observations, the doctor can determine the oxygen content according to the color of the blood. With video endoscopes known in the art, such information is not visible in the video image.

In order to be able to calibrate the entire measuring chain, reference measurements are periodically performed with the help of a reference object. Such a reference object can be, for example, a light object of homogenous coloration. The measurement values thus obtained are stored in a memory as reference values and used to calibrate the measuring chain. In practice, it is suggested to perform such a reference measurement daily. However, it is understood that the reference probe is not shown in the drawing.

Besides the real determination of the colorimetric data, the object under test is additionally visualized. Thereby, the positioning of the probe head is substantially simplified. The visualization is preferably performed on the computer monitor. Such a visualization is particularly important insofar as the probe head covers a relatively large area and, thus, the dentist does not know where exactly he has placed the probe head and where he has to place the probe head, respectively. However, with a visualization, the probe head can be positioned very exactly to the desired location and the position of the 400 measuring points with the colorimetric data is exactly known.

Besides the embodiment described herein before, a plurality of further embodiments are possible within the scope of the method steps defined in the appended claims. For example, the spectral resolution of the illumination could be dramatically reduced. Thereby, it would be sufficient to illuminate the object under test with light having at least three different wavelengths and wavelength portions, respectively, or the light reflected by the object under test could be separated, prior to reaching the detection assembly, into three different wavelengths and wavelength portions, respectively. This corresponds to a calorimeter assembly. It is understood that the wavelength portions and the intensity of the wavelength portions, respectively, are chosen according to the definition such that a calculation of the colorimetric data of the object under test is ensured.

As an example, a rotating filter wheel, a rotating circular variable filter member or an acoustically adjustable optical filter could be used as color separator member instead of a monochromator. Moreover, it is not imperative to arrange such a color separator in the illumination assembly; instead, with the same result, it could be arranged in front of the image sensor.

The embodiment explained herein before with the help of the accompanying drawing has proven particularly reliable due to practical reasons, because a location of the color separator outside of the probe head enables the probe head to be designed much smaller than in the case where the color separator had to be arranged in the interior of the probe head. Finally, it is to be noted that it would be possible to calculate the colorimetric data of each pixel on the basis of the measurement values delivered by the image sensor. Instead of the measurement values, it would be possible to directly store the colorimetric data of the individual pixels.

An alternative embodiment of the method and the apparatus, respectively, could be seen in a design in which only one image sensor is used instead of two sensors. The data delivered by the image sensor then could be used both for determining the colorimetric data as well as for positioning the probe head.

What is claimed is:

1. A method for determining the color stimulus specification of objects, particularly of translucent objects, in which the object under test is illuminated, in which the light reflected by said object under test is captured by at least one image sensor means, and in which the colorimetric data of said object under test are arithmetically evaluated by means of a suitable analyzer means, said step of illuminating said object under test comprising the steps of:

initiating a measuring cycle;
   subdividing the light by means of which said object under test is illuminated into a plurality of wave length bandwidth portions;
   illuminating said object under test consecutively by means of light comprising wavelengths of one of said plurality of wave length bandwidth portions; and
   terminating said measuring cycle.

2. A method for determining the color stimulus specification of objects, particularly of translucent objects, in which the object under test is illuminated, in which the light reflected by said object under test is captured by at least one image sensor means, and in which the colorimetric data of said object under test are arithmetically evaluated by means of a suitable analyzer means, said step of capturing said light reflected by said object under test illuminating said object under test by at least one image sensor means comprising the steps of:

initiating a measuring cycle;
   subdividing the light reflected by said object under test into a plurality of wave length bandwidth portions;
   consecutively directing said light reflected by said object under test and comprising wavelengths of one of said plurality of wave length bandwidth portions to said at least one image sensor means; and
   terminating said measuring cycle.

3. A method according to claim 1 in which said object under test is mapped on said at least one image sensor means, whereby the data signals delivered by said at least one image sensor means in response to said mapping are visualized.

4. A method according to claim 1 in which two image sensor means are provided, whereby one of said two image sensor means is used for visualizing said object under test and the other one of said two image sensor means is used for evaluating the colorimetric data of said object under test.

5. A method according to claim 4 in which a color image sensor means is used for visualizing said object under test, and a black-and-white color image sensor means is used for evaluating the colorimetric data of the object under test.

6. A method according to claim 3 in which said object under test is illuminated with visible light with a relative wave length portion of at least 300 nanometers for the purpose of visualizing said object under test.

7. A method according to claim 1 in which a monochromator means is used for creating said plurality of wave length bandwidth portions.

8. A method according to claim 4 in which the position of the image plane in which the object under test is mapped in focus is arithmetically calculated on the basis of the data signals delivered by said two image sensor means, and in which said image sensor means are displaced into that image plane.

9. A method according to claim 1 in which said object under test is illuminated evenly and over an extended area.

10. A method according to claim 1 in which both the light directed to said object under test as well as the light reflected by said object under test are polarized in order to suppress glare.

11. A method according to claim 9 in which an area of said object under test is illuminated that is greater than the area captured by said image sensor means and greater than the area that is authoritative for evaluating the color stimulus specification.

12. A method according to claim 3 in which the visualization of the data signals delivered by said image sensor means is used for positioning a probe head means that is provided with means for detecting the light reflected by said object under test.

13. A method according to claim 4 in which, for each wave length bandwidth portion and with regard to the reflected light, only the intensities of the gray values delivered by said black-and-white sensor means are measured for evaluating the colorimetric data of the object under test.

14. A method according to claim 1 in which said plurality of wave length bandwidth portions each have a bandwith of between 5 and 20 nanometers.

15. A method according to claim 1 in which the light, by means of which the object under test is illuminated, is subdivided into at least three wave length bandwidth portions, whereby the intensity distribution of the wave length bandwidth portions is chosen such that a calculation of the colorimetric data is ensured.

16. A method according to claim 2 in which the light reflected by said object under test is subdivided into at least three wave length bandwidth portions, whereby the intensity distribution of the wave length bandwidth portions is chosen such that a calculation of the colorimetric data is ensured.

17. A method according to claim 15 in which the measuring is performed in the region of the visible light.

18. A method according to one of the claim 1 in which the intensity information captured by means of said image sensor means is separately stored for each of said wave length bandwidth portions.

19. A method according to one of the claim 1 in which the colorimetric data of each pixel are calculated on the basis of the data signals delivered by said image sensor means.

20. A method according to claim 1 in which the area of the object under test that is authoritative for the colorimetric evaluation is determined on the basis of the data signals delivered by said image sensor means.

21. A method according to claim 1 in which in each case a certain number of pixels of said image sensor means is combined to an image point by averaging.

22. A method according to claim 21 in which the measurement area is horizontally and vertically subdivided into a predetermined number of color points by combining certain image points.

23. A method according to claim 21 in which a plurality of color points are combined to color zones having a uniform coloration, whereby the object under test is subdivided into a plurality of different color zones.

24. A method according to claim 21 in which the mean value of the combined image points or color zones is calculated and is used as relevant value for the calculation of a uniform color stimulus specification.

25. A method according to claim 1 in which the cross correlation is generated between data signals delivered by said image sensor means for each separate wave length portion and wave length bandwidth portion, respectively.

26. A method according to claim 25 in which said cross correlation is performed for all captured wave lengths and wave length bandwidth portions, respectively.

27. A method according to claim 1 in which the data signals gained by said analyzer means are used for a color correction of the visualized object under test.

28. A method according to claim 1 in which the data signals gained by said analyzer means are compared to the colors of reference scales and assigned to the most similar colors of said reference scales.

29. A method according to claim 1 in which the colorimetric data of the object under test are evaluated on the basis of the data signals gained by said analyzer means.

30. A method according to claim 1, further comprising the step of periodically performing reference measurements by means of a light and/or a dark reference object, whereby the detected data are stored as reference data that are used for calibrating the entire measuring chain.

31. An apparatus for determining the color stimulus specification of objects, particularly of translucent objects, comprising:
an illumination assembly means for illuminating the object under test;
a detection assembly means for capturing the light emitted by said illumination assembly means and reflected by said object under test, said detection assembly means including a lens assembly means and at least one image sensor means, and being adapted to deliver output signal data in response to the captured light;
an analyzer assembly means adapted for evaluating the colorimetric data of said object under test;
a probe head means adapted to receive selected parts and elements of said apparatus, said probe head means being adapted to be displaced towards said object under test for taking a measurement; and
means for visualizing said output signal data delivered by said detection assembly means;
said illumination assembly means further comprising a color separator means adapted to subdivide visible light into a plurality of wave length portions.

32. An apparatus for determining the color stimulus specification of objects, particularly of translucent objects, comprising:
an illumination assembly means for illuminating the object under test;
a detection assembly means for capturing the light emitted by said illumination assembly means and reflected by said object under test, said detection assembly means including a lens assembly means and at least one image sensor means, and being adapted to deliver output signal data in response to the captured light;
an analyzer assembly means adapted for evaluating the colorimetric data of said object under test;
a probe head means adapted to receive selected parts and elements of said apparatus, said probe head means being adapted to be displaced towards said object under test for taking a measurement; and
means for visualizing said output signal data delivered by said detection assembly means;
said detection assembly means further comprising a color separator means adapted to subdivide visible light into a plurality of wave length portions.

33. An apparatus according to claim 31 in which said detection assembly means comprises two image sensor means, one of said two image sensor means being adapted to evaluate the colorimetric data of said object under test, and the other one of said two image sensors being adapted to visualize said object under test.

34. An apparatus according to claim 33 in which one of said two image sensor means comprises a black-and-white image sensor chip means, and the other one of said two image sensors means comprises a color image sensor chip means.

35. An apparatus according to claim 33, further comprising an electrical drive means adapted to displace said two image sensor means into the image plane of said lens assembly means.

36. An apparatus according to claim 31 in which said color separator means comprises a rotating diffraction grating means, a rotating filter wheel means, a rotating circular variable filter means or an acoustically adjustable optical filter means.

37. An apparatus according to claim 31 in which said illumination assembly means comprises a light source means and a bundle of light conductive fibers means extending from said light source means to said probe head means, whereby said color separator means is located between said light source means and said bundle of light conductive fibers means.

38. An apparatus according to claim 31 in which said color separator means is designed as a monochromator means in the form of a rotating mirror means provided with a diffraction grating means.

39. An apparatus according to claim 31, further comprising a swiveling mirror means displaceable between a rest position and an operating position, said mirror means being located between said light source means and said color separator means when it is in its operating position.

40. An apparatus according to claim 31 further comprising an ultraviolet band elimination filter means located in front of said light source means.

41. An apparatus according to claim 31 in which said color separator means is constituted by a rotating filter wheel member comprising a plurality of optical band pass filter elements that are located along the periphery of a circle and having a relative band pass portion of between 5 nanometers and 20 nanometers for visible light.

42. An apparatus according to claim 41 in which said rotating filter wheel member further comprises an UV band elimination filter and/or a light impermeable region.

43. An apparatus according to claim 31 in which said probe head means is user-replaceable.

44. An apparatus according to claim 31, further comprising at least one optical polarizer means adapted to suppress glare on the object under test.

* * * * *

UNITED STATES PATENT AND TRADEMARK OFFICE
CERTIFICATE OF CORRECTION

PATENT NO. : 6,038,024
DATED : March 14, 2000
INVENTOR(S) : Markus Berner

It is certified that error appears in the above-indentified patent and that said Letters Patent is hereby corrected as shown below:

Column 11, line 1  after "to" delete --one of the--
Column 11, line 5 after "to" delete --one of the--

Signed and Sealed this

Tenth Day of April, 2001

Attest:

NICHOLAS P. GODICI

Attesting Officer      Acting Director of the United States Patent and Trademark Office